(12) United States Patent
Kim et al.

(10) Patent No.: US 11,143,404 B2
(45) Date of Patent: Oct. 12, 2021

(54) COMBUSTOR AND GAS TURBINE

(71) Applicants: MITSUBISHI HEAVY INDUSTRIES, LTD., Tokyo (JP); Mitsubishi Hitachi Power Systems, Ltd., Kanagawa (JP)

(72) Inventors: Taehwan Kim, Tokyo (JP); Keijiro Saito, Tokyo (JP); Shinji Akamatsu, Yokohama (JP); Kenji Miyamoto, Tokyo (JP)

(73) Assignee: MITSUBISHI POWER, LTD., Kanagawa (JP)

(*) Notice: Subject to any disclaimer, the term of this patent is extended or adjusted under 35 U.S.C. 154(b) by 271 days.

(21) Appl. No.: 16/088,244

(22) PCT Filed: Mar. 30, 2017

(86) PCT No.: PCT/JP2017/013178
§ 371 (c)(1),
(2) Date: Sep. 25, 2018

(87) PCT Pub. No.: WO2017/170834
PCT Pub. Date: Oct. 5, 2017

(65) Prior Publication Data
US 2020/0326073 A1    Oct. 15, 2020

(30) Foreign Application Priority Data

Mar. 30, 2016   (JP) .............................. JP2016-067125

(51) Int. Cl.
*F23R 3/14* (2006.01)
*F02C 7/04* (2006.01)
(Continued)

(52) U.S. Cl.
CPC .................. *F23R 3/14* (2013.01); *F02C 7/04* (2013.01); *F02C 7/22* (2013.01); *F23R 3/10* (2013.01); *F23R 3/28* (2013.01)

(58) Field of Classification Search
CPC .. F23R 3/14; F23R 3/286; F23C 7/002; F02C 7/25; F23D 14/82; F23D 2209/10
See application file for complete search history.

(56) References Cited

U.S. PATENT DOCUMENTS

| 7,077,622 B2 * | 7/2006 | Ehrhard | F01D 5/18 |
| | | | 415/47 |
| 2008/0148736 A1 | 6/2008 | Ishizaka et al. | |

(Continued)

FOREIGN PATENT DOCUMENTS

| CN | 1884910 | 12/2006 |
| CN | 101561141 | 10/2009 |

(Continued)

OTHER PUBLICATIONS

International Search Report dated Jun. 6, 2017 in corresponding International Application No. PCT/JP2017/013178.

(Continued)

*Primary Examiner* — Scott J Walthour
*Assistant Examiner* — Todd N Jordan
(74) *Attorney, Agent, or Firm* — Wenderoth, Lind & Ponack, L.L.P.

(57) ABSTRACT

There is provided a combustor including a nozzle main body (16) that includes a shaft body (24) which extends along an axis and has, inside the shaft body (24), a purge air flow path (29), which extends along the axis to a tip portion of the shaft body (24) and into which compressed air is introduced, and an air spraying hole (39), which is formed in the tip portion of the shaft body (24) and connects the purge air flow path (29) to an outer surface of the shaft body (24), a swirling blade (26), which overhangs from an outer circumferential surface of the shaft body (24) in a diameter direction of the axis and swirls a fluid flowing to a downstream side of an axial direction around the axis, and a fuel spraying hole (38), and a sealing member (40) that seals the air (Continued)

spraying hole (39) and is formed of a metal having a melting point lower than a melting point of a metal forming the nozzle main body (16).

3 Claims, 6 Drawing Sheets

(51) Int. Cl.
*F02C 7/22* (2006.01)
*F23R 3/10* (2006.01)
*F23R 3/28* (2006.01)

(56) References Cited

U.S. PATENT DOCUMENTS

| | | |
|---|---|---|
| 2008/0184708 A1 | 8/2008 | Moriwaki et al. |
| 2009/0241508 A1* | 10/2009 | Davis, Jr. ............. F23D 14/82 60/39.091 |
| 2009/0293482 A1 | 12/2009 | Davis, Jr. et al. |
| 2010/0064690 A1 | 3/2010 | Bailey et al. |
| 2011/0073071 A1 | 3/2011 | Smith |
| 2014/0075953 A1* | 3/2014 | Myers ............. F23N 5/082 60/779 |
| 2015/0285503 A1 | 10/2015 | Li et al. |

FOREIGN PATENT DOCUMENTS

| | | |
|---|---|---|
| CN | 101676535 | 3/2010 |
| CN | 102192503 | 9/2011 |
| CN | 102575584 | 7/2012 |
| JP | 2005-195284 | 7/2005 |
| JP | 2006-336996 | 12/2006 |
| JP | 4070758 | 4/2008 |
| JP | 2009-287562 | 12/2009 |
| JP | 2010-71641 | 4/2010 |

OTHER PUBLICATIONS

Written Opinion of the International Searching Authority dated Jun. 6, 2017 in corresponding International Application No. PCT/JP2017/013178 (with English translation).

* cited by examiner

UPSTREAM SIDE ←—Da—→ DOWNSTREAM SIDE

UPSTREAM SIDE ←—Da—→ DOWNSTREAM SIDE

COMBUSTOR AND GAS TURBINE

TECHNICAL FIELD

The present invention relates to a combustor and a gas turbine. Priority is claimed on Japanese Patent Application No. 2016-067125, filed on Mar. 30, 2016, the content of which is incorporated herein by reference.

BACKGROUND ART

In general, a gas turbine includes a compressor that compresses external air to generate compressed air, a combustor that combusts fuel in the compressed air to generate a high-temperature and high-pressure combustion gas, and a turbine that is rotation-driven by the combustion gas.

Although a rise in the temperature of a turbine inlet is necessary to improve the efficiency of the gas turbine, there is a problem of an exponential increase in NOx accompanying the temperature rise. For example, a combustor disclosed in the following PTL 1 includes, as a countermeasure against an increase in NOx, a burner that forms an air-fuel mixture by a swirling flow to suppress the formation of a locally high temperature region.

The burner of the combustor includes a nozzle which is a shaft body extending along a burner axis, a burner cylinder which surrounds an outer circumference of the nozzle and jets compressed air and fuel to a downstream side, and a swirling blade which swirls a fluid in the burner cylinder around a burner axis.

CITATION LIST

Patent Literature

PTL 1 Japanese Unexamined Patent Application, First Publication No. 2006-336996

SUMMARY OF INVENTION

Technical Problem

It is known that a phenomenon, in which a flame moves upstream (vortex core flashback) of a swirling flow when a swirling premixed gas combusts, often occurs. When an abnormal fuel such as a vortex core flashback occurs, there is a possibility that flame sticks to the nozzle and damage due to heat occurs. Therefore, it is desirable to suppress this occurrence.

The invention provides a combustor and a gas turbine capable of avoiding a vortex core flashback even in a case where abnormal combustion such as the vortex core flashback has occurred.

Solution to Problem

According to a first aspect of the invention, there is provided a combustor including a nozzle main body that includes a shaft body which extends along an axis and has, inside the shaft body, a purge air flow path, which extends along the axis to a tip portion of the shaft body and into which compressed air is introduced, and an air spraying hole, which is formed in the tip portion of the shaft body and connects the purge air flow path to an outer surface of the shaft body, a swirling blade, which overhangs from an outer circumferential surface of the shaft body in a diameter direction of the axis and swirls a fluid flowing to a downstream side of an axial direction around the axis, and a fuel spraying hole, and a sealing member that seals the air spraying hole and is formed of a metal having a melting point lower than a melting point of a metal forming the nozzle main body.

In such a configuration, even in a case where abnormal combustion such as a vortex core flashback has occurred, it is possible to avoid the vortex core flashback by compressed air being sprayed from the air spraying hole onto the downstream side of the nozzle main body. Accordingly, it is possible to prevent the combustor from being damaged by heat due to a vortex core flashback.

In the combustor, the sealing member may have a plate shape, may be formed around an opening of the air spraying hole on an outer surface side of the shaft body, and may be joined to a recessed portion into which the sealing member can be fitted.

In such a configuration, the thickness of a sealing member can be changed according to conditions of use or specifications of the gas turbine. That is, it is easy to make the sealing member reliably melt when a vortex core flashback occurs.

According to a second aspect of the invention, there is provided a combustor including a nozzle main body that includes a shaft body which extends along an axis and has, inside the shaft body, a purge air flow path, which extends along the axis and into which compressed air is introduced, and an internal space, which is formed in a tip portion of the shaft body and communicates with the purge air flow path, a swirling blade, which overhangs from an outer circumferential surface of the shaft body in a diameter direction of the axis and swirls a fluid flowing to a downstream side of an axial direction around the axis, and a fuel spraying hole. The tip portion of the shaft body has a thin portion in which a thickness between an outer surface of the shaft body and an inner surface of the internal space is smaller than a thickness of the other part of the shaft body.

In such a configuration, even in a case where abnormal combustion such as a vortex core flashback has occurred, it is possible to avoid the vortex core flashback by the thin portion melting and compressed air being sprayed onto the downstream side of the nozzle main body.

In addition, the thickness of the tip portion can be changed according to conditions of use or specifications of the gas turbine. That is, it is easy to make the tip portion reliably melt when a vortex core flashback occurs.

According to a third aspect of the invention, there is provided a combustor including a nozzle main body that includes a shaft body which extends along an axis and has, inside the shaft body, a purge air flow path, which extends along the axis and into which compressed air is introduced, an internal space, which is formed in a tip portion of the shaft body and communicates with the purge air flow path, and an air spraying hole, which is formed in the tip portion of the shaft body and connects the internal space to an outer surface of the shaft body, a swirling blade, which overhangs from an outer circumferential surface of the shaft body in a diameter direction of the axis and swirls a fluid flowing to a downstream side of an axial direction around the axis, and a fuel spraying hole, and a valve device which is provided inside the internal space, opens and closes the air spraying hole, and has a valve shaft which is held so as to freely advance and retreat in one direction, a valve body which is attached to a tip of the valve shaft and is movable to a first position of being in close contact with the air spraying hole and a second position of being separated away from the air spraying hole, a biasing member which biases the valve body in a direction of the first position, and a thermal elongation member which is disposed between the valve body and the air spraying hole, is formed of a metal having a coefficient of thermal expansion higher than a coefficient of thermal expansion of a metal forming the biasing member, and moves the valve body to the second position by thermal elongation.

In such a configuration, even in a case where abnormal combustion such as a vortex core flashback has occurred, it is possible to avoid the vortex core flashback by compressed air being sprayed from the air spraying hole onto the downstream side of the nozzle main body. Accordingly, it is possible to prevent the combustor from being damaged by heat due to a vortex core flashback.

In addition, the valve device can be repeatedly used even after the nozzle main body has exposed to the vortex core flashback.

According to a fourth aspect of the invention, there is provided a gas turbine including the combustor, a compressor that compresses air and supplies the air to the combustor, and a turbine that is driven by a combustion gas formed by combustion of fuel in the combustor.

Advantageous Effects of Invention

According to the invention, even in a case where abnormal combustion such as a vortex core flashback has occurred, it is possible to avoid the vortex core flashback by compressed air being sprayed onto the downstream side of the nozzle main body.

DESCRIPTION OF EMBODIMENTS

First Embodiment

Hereinafter, a gas turbine 1 according to a first embodiment of the invention will be described in detail with reference to the drawings.

Figure 1:
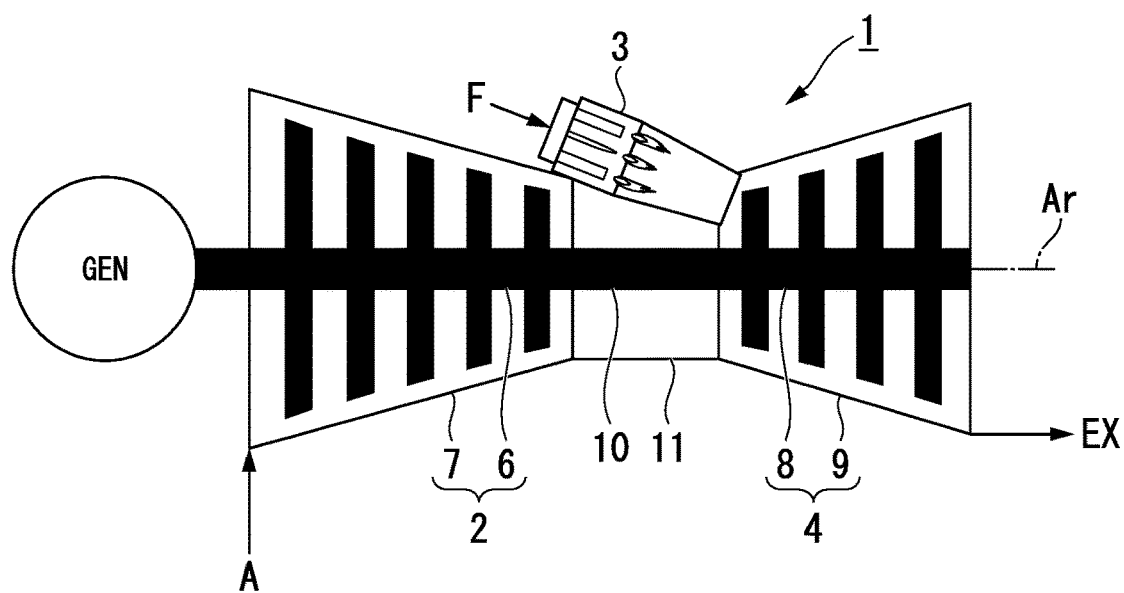
FIG. 1 is a schematic view illustrating a configuration of a gas turbine according to a first embodiment of the invention.

As illustrated in FIG. 1, the gas turbine 1 of the embodiment includes a compressor 2 that compresses air A to generate compressed air, a plurality of combustors 3 that combust fuel F in the compressed air to generate a high-temperature and high-pressure combustion gas, and a turbine 4 that is rotation-driven by the combustion gas.

The compressor 2 has a compressor rotor 6 that rotates about a rotational axis Ar and a compressor casing 7 that rotatably covers the compressor rotor 6. The turbine 4 has a turbine rotor 8 that rotates about the rotational axis Ar and a turbine casing 9 that rotatably covers the turbine rotor 8.

The rotational axis of the compressor rotor 6 and the rotational axis of the turbine rotor 8 are located on the same straight line. The compressor rotor 6 and the turbine rotor 8 are connected to each other and form a gas turbine rotor 10. The compressor casing 7 and the turbine casing 9 are connected to each other and form a gas turbine casing 11.

For example, a rotor of a generator GEN is connected to the gas turbine rotor 10. The combustors 3 are fixed to the gas turbine casing 11.

Figure 2:
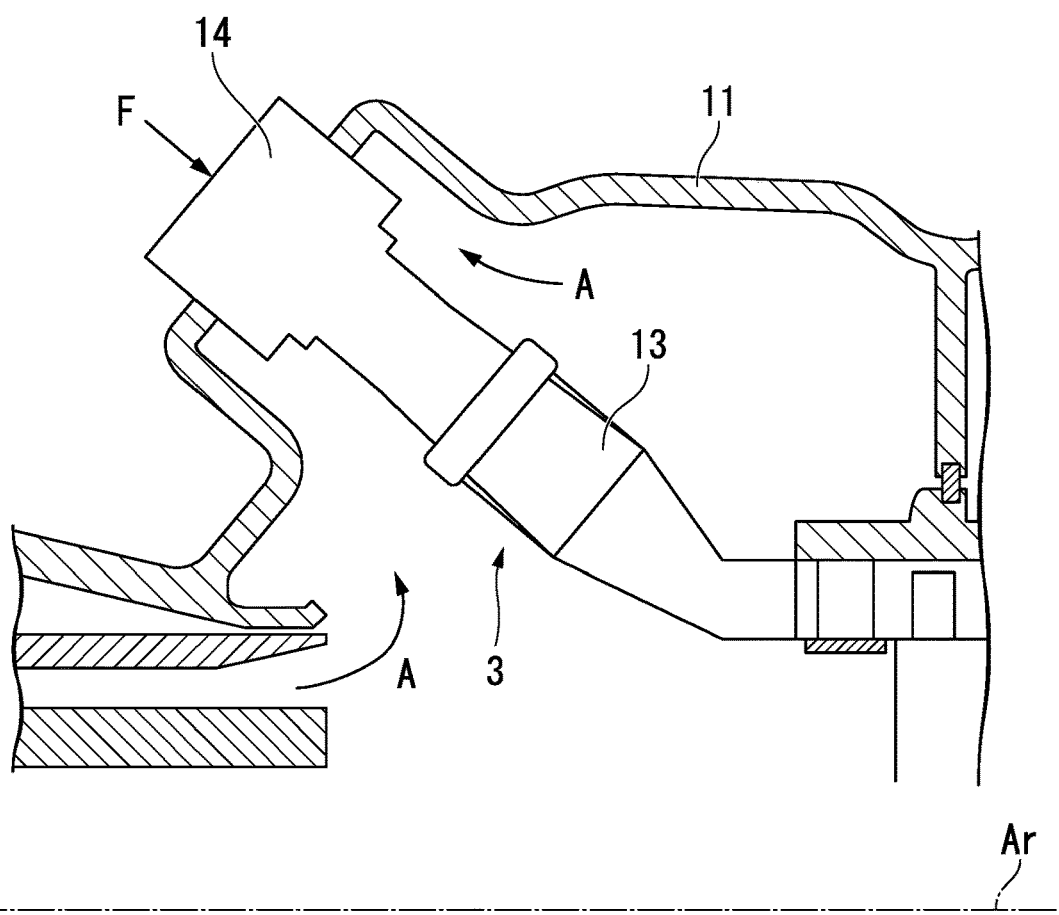
FIG. 2 is a sectional view of a vicinity of a combustor of the gas turbine according to the first embodiment of the invention.

As illustrated in FIG. 2, each of the combustors 3 has a combustion cylinder 13 (or a transition piece) and a fuel jetter 14. The fuel F combusts inside the combustion cylinder 13. The combustion cylinder 13 sends a combustion gas, which is generated as a result of combustion of the fuel F, to the turbine 4. The fuel jetter 14 jets the fuel F and the compressed air A into the combustion cylinder 13.

Figure 3:
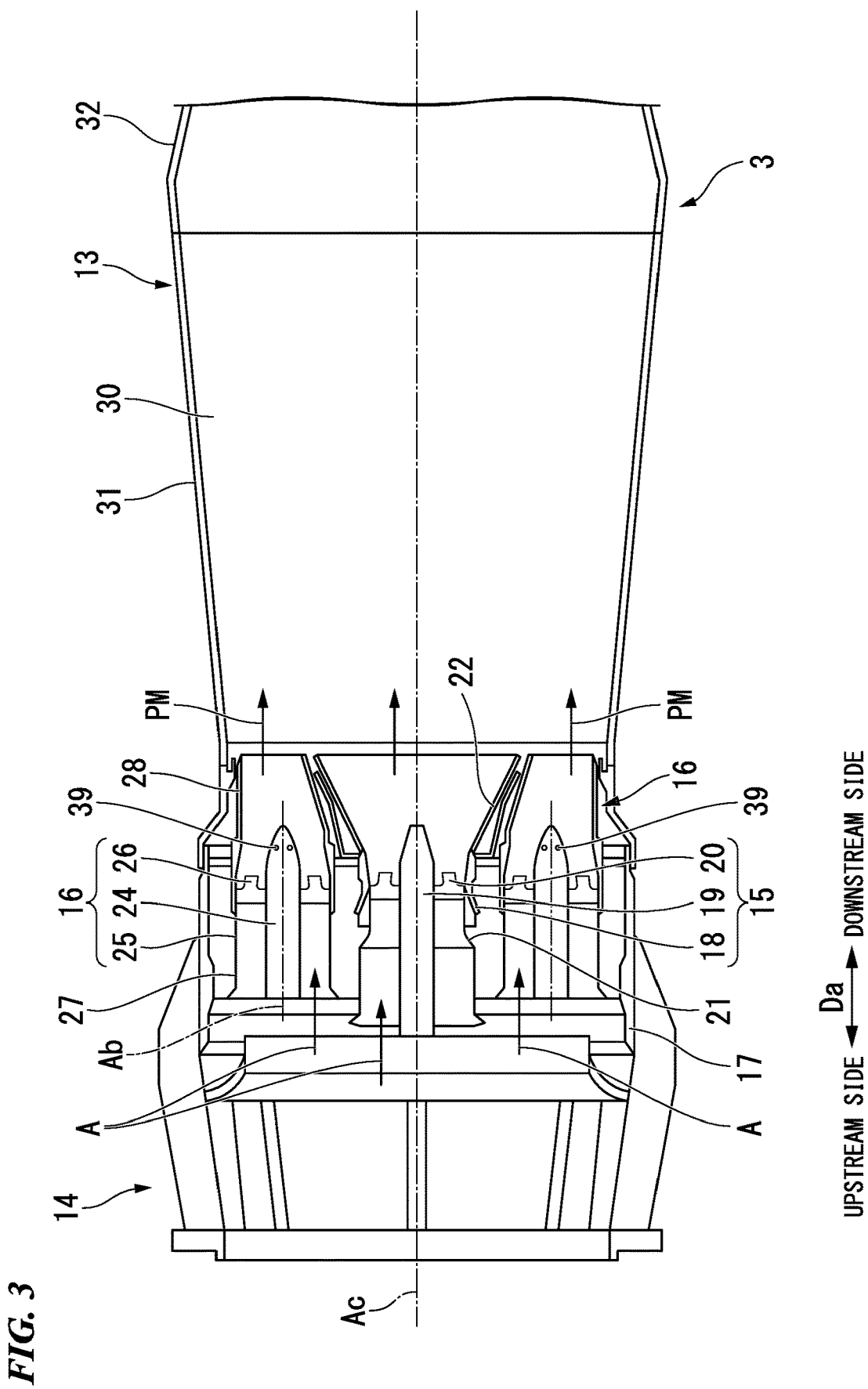
FIG. 3 is a sectional view of the combustor according to the first embodiment of the invention.

As illustrated in FIG. 3, the fuel jetter 14 includes a pilot burner 15, main burners 16 (nozzle main bodies), and a burner holding cylinder 17. The pilot burner 15 diffuses and combusts the jetted fuel. The main burners 16 premix and combust the jetted fuel. The burner holding cylinder 17 holds the pilot burner 15 and the main burners 16.

The pilot burner 15 has a pilot nozzle 19, a pilot burner cylinder 18, and a plurality of swirling blades 20. The pilot nozzle 19 is a shaft body about a combustor axis Ac, which extends in an axial direction Da. The pilot burner cylinder 18 covers an outer circumference of the pilot nozzle 19. The swirling blades 20 swirl the compressed air A around the combustor axis Ac. Herein, one side of the axial direction Da, which is a direction where the combustor axis Ac extends, is set as an upstream side (the right in FIG. 3), and the other side is set as a downstream side (the left in FIG. 3). In addition, the combustor axis Ac is also a burner axis of the pilot burner 15.

A spraying hole is formed in a downstream end portion of the pilot nozzle 19. The plurality of swirling blades 20 are provided on the upstream side of a position at which the spraying hole is formed. Each of the swirling blades 20 extends from the outer circumference of the pilot nozzle 19 in a direction including a radial direction component and is connected to an inner circumferential surface of the pilot burner cylinder 18.

The pilot burner cylinder 18 has a main body 21 located on the outer circumference of the pilot nozzle 19 and a cone portion 22, which is connected to a downstream side of the main body 21 and has a diameter gradually increasing toward the downstream side. The plurality of swirling blades 20 are connected to an inner circumferential surface of the main body 21 of the pilot burner cylinder 18. The compressed air A, which is obtained by air being compressed by the compressor 2 from the upstream side of the pilot burner cylinder, flows into the pilot burner cylinder 18. The pilot burner cylinder 18 jets, from a downstream end thereof, fuel sprayed from the pilot nozzle 19, along with the compressed air A. This fuel diffuses and combusts in the combustion cylinder 13.

The plurality of main burners 16 are disposed so as to be arranged in a circumferential direction about the combustor axis Ac such that an outer circumferential side of the pilot burner 15 is surrounded.

Each of the main burners 16 has a main nozzle 24, a main burner cylinder 25, and a plurality of swirling blades 26. The main nozzle 24 is a shaft body extending along a burner axis Ab that is parallel to the combustor axis Ac. The main burner cylinder 25 covers an outer circumference of the main nozzle 24. The swirling blades 26 swirl the compressed air A around the burner axis Ab.

Since the burner axis Ab of each of the main burners 16 is parallel to the combustor axis Ac, an axial direction related to the combustor axis Ac and an axial direction related to the burner axis Ab are the same direction.

In addition, the upstream side of the axial direction related to the combustor axis Ac is the upstream side of the axial direction related to the burner axis Ab. The downstream side of the axial direction related to the combustor axis Ac is the downstream side of the axial direction related to the burner axis Ab.

The main nozzle 24 is formed of, for example, a metal such as stainless steel. A metal having a melting point of 1,000° C. or higher can be adopted as a metal for forming the main nozzle 24.

The plurality of swirling blades 26 are provided at an intermediate portion of the main nozzle 24 in the axial direction Da. The main burner cylinder 25 has a main body 27 which is located on an outer circumference of the main nozzle 24 and an extended portion 28, which is connected to the downstream side of the main body 27 and extends toward the downstream side.

The plurality of swirling blades 26 are connected to an inner circumferential surface of the main body 27 of the main burner cylinder 25. A plurality of fuel spraying holes 38 (refer to FIG. 4) for spraying fuel (gas fuel) are formed in each of the plurality of swirling blades 26. Fuel is supplied into the main nozzle 24 and the fuel is supplied from the main nozzle 24 to the swirling blades 26.

The compressed air A, which is obtained by air being compressed by the compressor 2 from the upstream side of the main burner cylinder, flows into the main burner cylinder 25. The compressed air A and fuel sprayed from the swirling blades 26 are mixed to form a premixed gas PM in the main burner cylinder 25. The main burner cylinder 25 jets the premixed gas PM from a downstream end thereof. The fuel in the premixed gas PM is premixed and combusts in the combustion cylinder 13.

The burner holding cylinder 17 has a cylindrical shape about the combustor axis Ac, and covers an outer circumferential side of the plurality of main burner cylinders 25.

The combustion cylinder 13 has a combusting unit 31 and a combustion gas guiding unit 32. The combusting unit 31 has a cylindrical shape about the combustor axis Ac. The combusting unit 31 forms a combustion region 30 where fuel jetted from the main burners 16 and the pilot burner 15 combusts. The combustion gas guiding unit 32 has a tubular shape. The combustion gas guiding unit 32 leads a combustion gas generated by the combustion of fuel into a combustion gas flow path of the turbine 4. The combustion gas guiding unit 32 of the combustion cylinder 13 is formed on the downstream side of the combusting unit 31 of the combustion cylinder 13.

Figure 4:
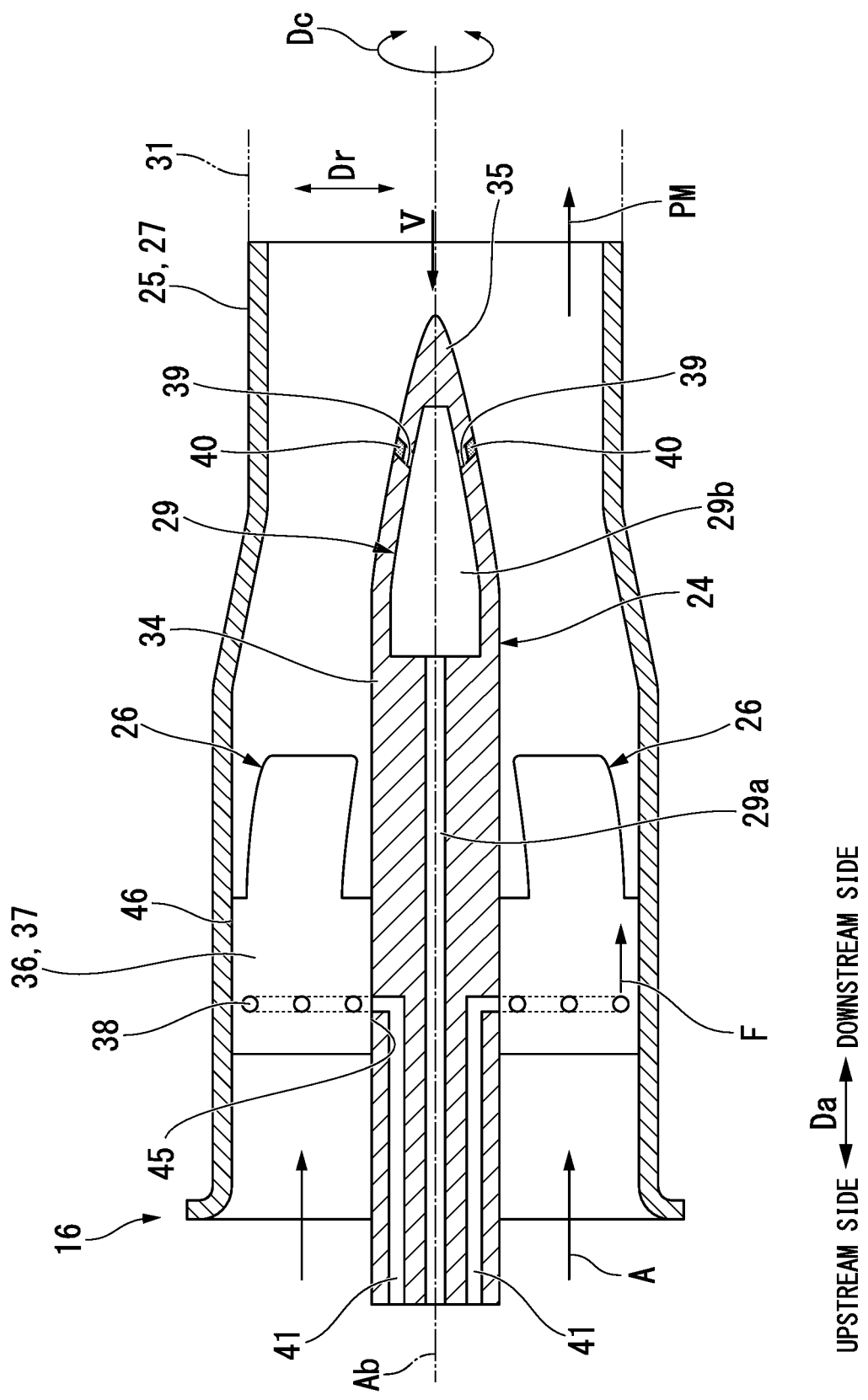
FIG. 4 is a sectional view of a main burner according to the first embodiment of the invention.

As illustrated in FIG. 4, each of the swirling blades 26 of the main burner 16 overhangs from an outer circumferential surface of the main nozzle 24 in a diameter direction and is connected to an inner circumferential surface of the main burner cylinder 25. The swirling blades 26 are formed to swirl a fluid circulating on the downstream side around the burner axis Ab.

The main nozzle 24 has a main nozzle main body 34 having a cylindrical shape and a sharp tip portion 35 provided on the downstream side of the main nozzle main body 34. The tip portion 35 gradually becomes thinner toward the downstream side. In other words, the tip portion 35 is formed in a tapered shape tapering off toward a tip on the downstream side.

Each of the swirling blades 26 has a nozzle-side connecting portion 45, a cylinder-side connecting portion 46, and a profile portion 36. The nozzle-side connecting portion 45 is connected to an outer circumferential surface of the main nozzle main body 34. The cylinder-side connecting portion 46 is connected to the inner circumferential surface of the main burner cylinder 25. A smooth and continuous profile surface 37 is formed in the profile portion 36 in order to swirl a fluid which has flowed from the upstream side around the burner axis Ab. A circumferential direction about the burner axis Ab will be hereinafter simply referred to as a circumferential direction Dc, and a diameter direction Dr about the burner axis Ab will be hereinafter simply referred to as the diameter direction Dr.

The plurality of fuel spraying holes 38 for spraying the fuel F are formed in each of the swirling blades 26.

Each of the main burners 16 has fuel flow paths 41, a purge air flow path 29, air spraying holes 39, and sealing members 40. The fuel flow paths 41 spray the fuel F from the fuel spraying holes of the swirling blades 26. Inside the main nozzle 24, the purge air flow path 29 extends to the tip portion 35 of the main nozzle 24 along the burner axis Ab, and the compressed air A is introduced into the purge air flow path. The compressed air A is sprayed through the air spraying holes 39. The sealing members 40 seal the air spraying holes 39.

The purge air flow path 29 has an air flow path main body 29a and a diameter increasing portion 29b. The air flow path main body 29a extends along the burner axis Ab inside the main nozzle 24. The diameter increasing portion 29b is formed inside the tip portion 35 of the main nozzle 24, which is on the downstream side of the air flow path main body 29a.

The compressed air A generated by the compressor (refer to FIG. 1) is introduced in the purge air flow path 29. The purge air flow path 29 extends to the vicinity of an outer surface of the tip portion 35 of the main nozzle 24. A sectional shape of the diameter increasing portion 29b seen in the axial direction Da is larger than a sectional shape of the air flow path main body 29a seen in the axial direction Da. It is preferable that the diameter increasing portion 29b have a shape following the outer surface of the tip portion 35 of the main nozzle 24.

Figure 5:
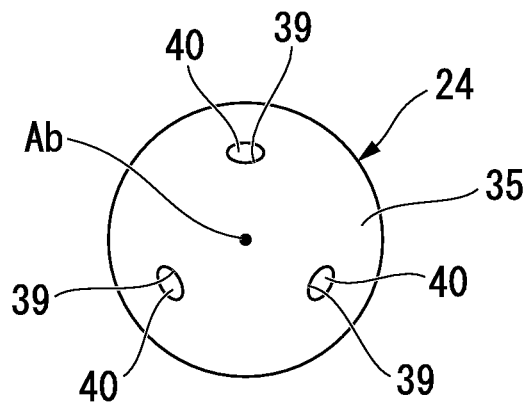
FIG. 5 is a sectional view taken along an arrow V of FIG. 4 and is a view for describing disposition of an air spraying hole according to the first embodiment of the invention.

The air spraying holes 39 are formed in the tip portion 35 of the main nozzle 24. Each of the air spraying holes 39 connects the diameter increasing portion 29b of the purge air flow path 29 to the outer surface of the tip portion 35 of the main nozzle 24. As illustrated in FIG. 5, three air spraying holes 39 are equidistantly formed in a circumferential direction of the burner axis Ab. The number of the air spraying holes 39 is not limited thereto.

An axis of each of the air spraying holes 39 is tilted toward the downstream side as approaching from a burner axis Ab side to an outside in the diameter direction. Each of the air spraying holes 39 is oriented such that the compressed air A introduced in the air spraying hole 39 via the purge air flow path 29 is sprayed toward the downstream side of the main nozzle 24. A sectional shape of each of the air spraying holes 39 of the embodiment is circular.

Each of the sealing members 40 is a member that closes each of the air spraying holes 39. A surface of each of the sealing members 40, which faces the outside in the diameter direction, is formed to be flush with the outer surface of the tip portion 35 of the main nozzle 24. The sealing members 40 of the embodiment are formed of aluminum (Al). The sealing members 40 of the embodiment are buried in the air spraying holes 39 by melting an aluminum brazing material.

Without being limited thereto, a low melting point metal having a melting point of 500° C. to 600° C., the melting point being lower than that of the metal forming the main nozzle 24, can be used as a material for forming the sealing members 40.

Next, an operation and an effect of the gas turbine 1 of the embodiment will be described.

The compressor 2 sucks external air and compresses the air. The air compressed by the compressor 2 is guided into the main burners 16 and the pilot burner 15 of each of the combustors 3. Fuel is supplied from a fuel supply source to the main burners 16 and the pilot burner 15. The main burners 16 jet the premixed gas PM, which is obtained by premixing fuel and air, into the combusting unit 31 of the combustion cylinder 13. The premixed gas PM is premixed and combusts in the combusting unit 31. In addition, the pilot burner 15 jets each of fuel and air into the combusting unit 31 of the combustion cylinder 13. This fuel diffuses and combusts or is premixed and combusts in the combusting unit 31. The combustion mode can be changed in any manner by selecting a fuel jetting part of the pilot burner 15. A high-temperature and high-pressure combustion gas generated by the combustion of fuel in the combusting unit 31 of the combustion cylinder 13 is led into the combustion gas flow path of the turbine 4 by the combustion gas guiding unit 32 of the combustion cylinder 13 to rotate the turbine rotor 8.

Air compressed by the compressor 2 is introduced from an upstream end of the main burner cylinder 25 into the main burner cylinder 25. This air swirls around the burner axis Ab by the plurality of swirling blades 26 in the main burner cylinder 25. Fuel is sprayed from the fuel spraying holes 38 of the plurality of swirling blades 26 into the main burner cylinder 25.

After the fuel F sprayed from the swirling blades 26 and the air A flowing to the downstream side while swirling are premixed in the main burner cylinder 25, the fuel and the air are jetted, as the premixed gas PM, from the downstream end of the main burner cylinder 25 into the combustion cylinder 13.

A swirling flow formed by the plurality of swirling blades 26 promotes mixing of the fuel F, which is sprayed from the fuel spraying holes 38 of the plurality of swirling blades 26 in the main burner cylinder 25, and the air A. In addition, a flame stabilizing effect of premixed flame formed by the combustion of the premixed gas PM is enhanced by the premixed gas PM being jetted from the main burner cylinder 25 into the combustion cylinder 13 while swirling.

For example, when the swirling premixed gas PM combusts, flame moves upstream in some cases due to a vortex core flashback. When the vortex core flashback, which is flame at 700° C. or higher, reaches the main nozzle 24, the sealing members 40 formed of aluminum having a melting point lower than that of the metal forming the main nozzle 24 melt.

Accordingly, the compressed air A is sprayed from the air spraying holes 39 as purge air. By the compressed air A being sprayed, the vortex core flashback returns to the downstream side.

According to the embodiment, even in a case where abnormal combustion such as a vortex core flashback has occurred, the compressed air A from the air spraying holes 39 is sprayed onto the downstream side of the main nozzle 24. For this reason, it is possible to avoid a vortex core flashback by lowering the distribution of fuel concentration of a vortex core. Accordingly, it is possible to prevent the combustors from being damaged by heat due to a vortex core flashback.

Figure 6:
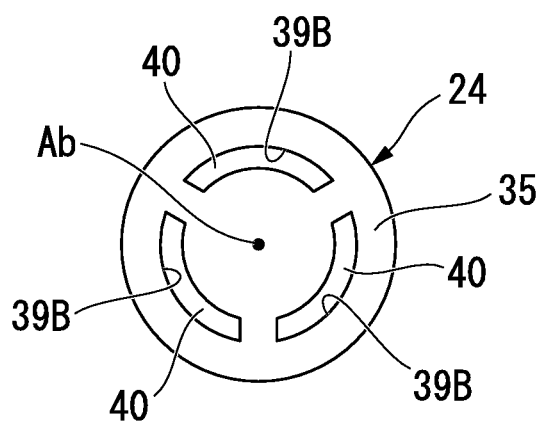
FIG. 6 is a view for describing a shape of an air spraying hole according to a first modification example of the first embodiment of the invention.
Figure 7:
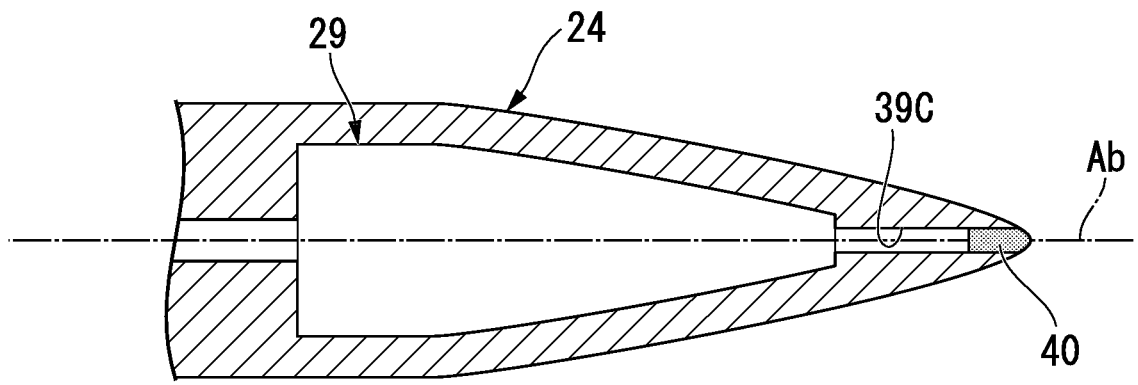
FIG. 7 is a view for describing a shape of an air spraying hole according to a second modification example of the first embodiment of the invention.

Although the sectional shape of each of the air spraying holes 39 is circular in the embodiment, the sectional shape is not limited thereto. For example, as air spraying holes 39B according to a first modification example illustrated in FIG. 6, the sectional shape may be a slit in the circumferential direction of the burner axis Ab. In addition, one air spraying hole 39C may be formed along the burner axis Ab as in a second modification example illustrated in FIG. 7.

In the embodiment, the fuel spraying holes 38 for spraying the fuel F are formed in each of the swirling blades 26, and the fuel F is sprayed into the main burner cylinder 25 from the fuel spraying holes. However, a member in which a separate fuel spraying hole is formed may be provided instead of forming the fuel spraying holes 38 in each of the swirling blades 26.

Second Embodiment

Hereinafter, a combustor of a second embodiment of the invention will be described in detail with reference to the drawings. Differences from the first embodiment described above will be mainly described and description of the same portions will be omitted in the embodiment.

Figure 8:
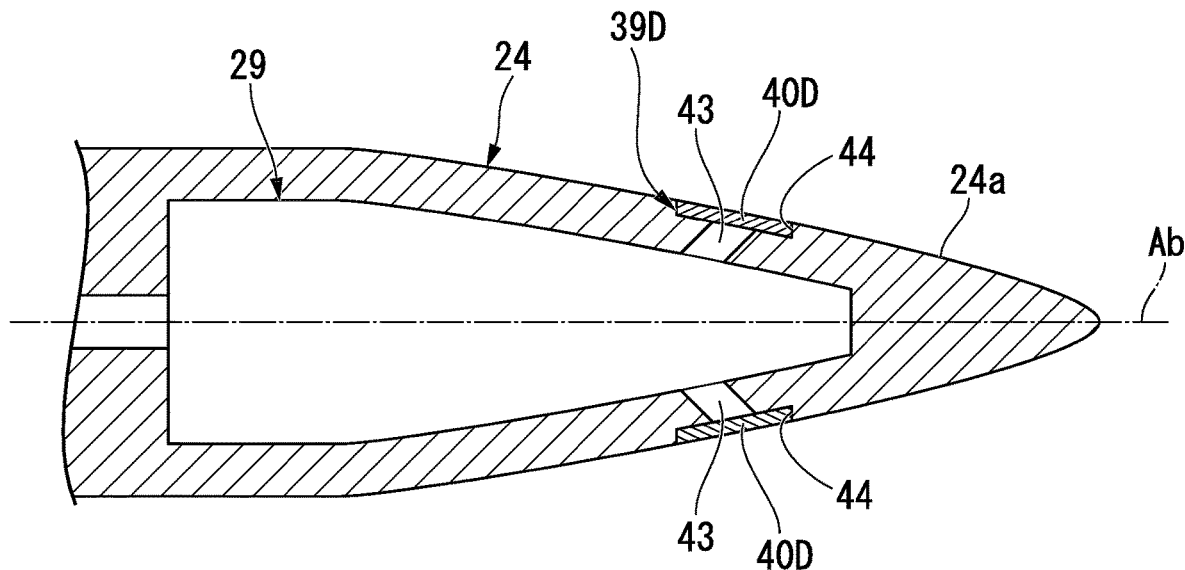
FIG. 8 is a sectional view of a main nozzle according to a second embodiment of the invention.

As illustrated in FIG. 8, each of air spraying holes 39D of the embodiment has a spraying hole main body 43 and a plate accommodating portion 44 formed on an outer surface side of the main nozzle 24.

Sealing members 40D of the embodiment are metal plates having a plate shape.

The plate accommodating portion 44 is a recessed portion, which is formed around an opening of each of the air spraying holes 39D on an outer surface 24a side of the main nozzle 24 and into which each of the sealing members 40D can be fitted.

The plate accommodating portion 44 is formed so as to be larger than a sectional shape of the spraying hole main body 43. The plate accommodating portion 44 has a shape corresponding to each of the sealing members 40D, which is a metal plate. The plate accommodating portion 44 is formed such that a surface of each of the sealing members 40D and the outer surface of the main nozzle 24 are disposed on the substantially same plane when each of the sealing members 40D is fitted in the plate accommodating portion 44.

Each of the sealing members 40D, which is a metal plate, has a predetermined thickness. A planar shape of each of the sealing members 40D may be circular, or may be rectangular. After being fitted in the plate accommodating portion 44, each of the sealing members 40D is joined to the plate accommodating portion 44 by welding or the like.

The sealing members 40D are formed of an aluminum alloy. Without being limited thereto, a low melting point metal having a melting point of 500° C. to 600° C., the melting point being lower than that of the metal forming the main nozzle 24, can be used as a material for forming the sealing members 40D.

The thickness of each of the sealing members 40D is set as appropriate by experiments or the like. The thickness of each of the sealing members 40D is set to a thickness, which allows reliable melting when exposed to flame such as a vortex core flashback and does not allow melting during normal operation of the gas turbine. That is, the thickness of each of the sealing members 40D can be regulated according to conditions of use. The depth of the plate accommodating portion 44 is set as appropriate according to the thickness of each of the sealing members 40D.

According to the embodiment, the thickness of each of the sealing members 40D can be changed according to conditions of use or specifications of the gas turbine. That is, it is easy to make the sealing members reliably melt when a vortex core flashback occurs.

Third Embodiment

Hereinafter, a combustor of the second embodiment of the invention will be described in detail with reference to the drawings. Differences from the first embodiment described above will be mainly described and description of the same portions will be omitted in the embodiment.

Figure 9:
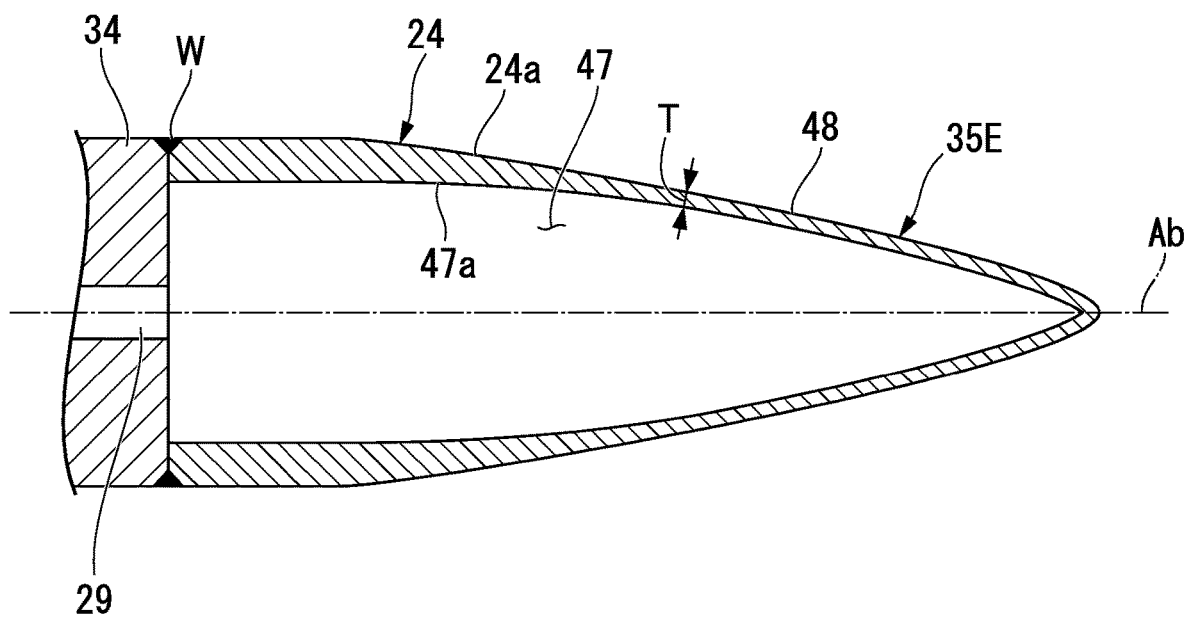
FIG. 9 is a sectional view of a main nozzle according to a third embodiment of the invention.

As illustrated in FIG. 9, the main nozzle 24 of the embodiment has the cylindrical main nozzle main body 34 and a tip portion 35E, of which a tip side is formed by a thin plate and which has an internal space 47. The tip portion 35E and the main nozzle main body 34 can be joined to each other, for example, by welding.

The internal space 47 of the tip portion 35E communicates with the purge air flow path 29.

The tip side of the tip portion 35E is formed to have a thickness T of, for example, 2 mm or less. In other words, the tip portion 35E has a thin portion 48 in which the thickness T between an outer surface 24a of the main nozzle 24 and an inner surface 47a of the internal space 47 is smaller than those of other parts of the main nozzle 24.

A range in which the tip portion 35E is formed so as to have the thickness T of 2 mm or less is set as appropriate by experiments or the like. In the range in which the tip portion 35E is formed so as to have the thickness T of 2 mm or less, it is preferable to set a thickness, which allows reliable melting when exposed to flame such as a vortex core flashback and does not allow melting during normal operation of the gas turbine. The thickness T of the tip portion 35E can be regulated according to conditions of use.

For example, when flame moves upstream due to a vortex core flashback and reaches the main nozzle 24, the thin portion 48 of the tip portion 35E, which is formed to be thinner than other parts of the main nozzle 24, melts.

Accordingly, the compressed air A is sprayed as purge air. By the compressed air A being sprayed, the vortex core flashback returns to the downstream side.

According to the embodiment, even in a case where abnormal combustion such as a vortex core flashback has occurred, the thin portion 48 melts and the compressed air A is sprayed onto the downstream side of the main nozzle 24. Accordingly, it is possible to avoid a vortex core flashback by lowering the distribution of fuel concentration of a vortex core.

In addition, the thickness T of the tip portion 35E can be changed according to conditions of use or specifications of the gas turbine. That is, it is easy to make the tip portion 35E reliably melt when a vortex core flashback occurs.

Fourth Embodiment

Hereinafter, a combustor of a fourth embodiment of the invention will be described in detail with reference to the drawings. Differences from the first embodiment described above will be mainly described and description of the same portions will be omitted in the embodiment.

Figure 10:
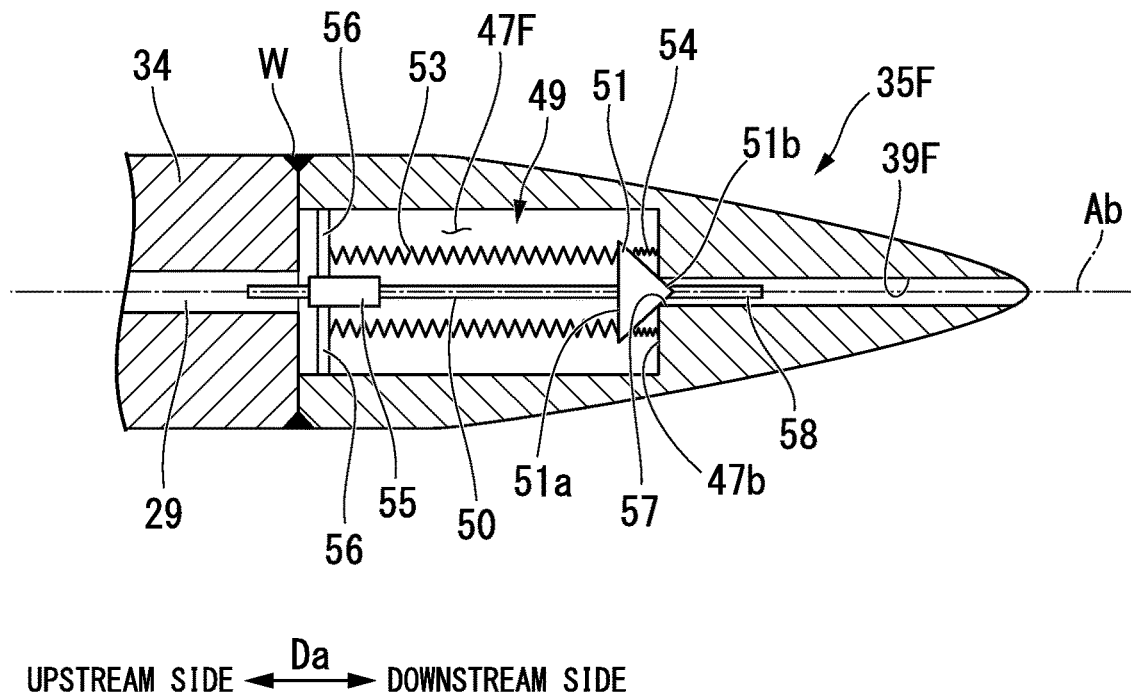
FIG. 10 is a sectional view of a main nozzle according to a fourth embodiment of the invention.

As illustrated in FIG. 10, a tip portion 35F of a main nozzle 24 of the embodiment has a cylindrical internal space 47F, an air spraying hole 39F, and a valve device 49. The internal space 47F is formed so as to extend along the burner axis Ab. The air spraying hole 39F connects the internal space 47F to the outer surface 24a of the main nozzle 24. The valve device 49 is provided in the internal space 47F and opens and closes the air spraying hole 39F.

The valve device 49 has a valve shaft 50, a valve body 51, a first compression coil spring 53, and a second compression coil spring 54 (thermal elongation member). The valve shaft 50 extends along the burner axis Ab. The valve body 51 is provided on a tip of the valve shaft 50. The first compression coil spring 53 is provided on the upstream side of the valve body 51. The second compression coil spring 54 is provided on the downstream side of the valve body 51.

The valve shaft 50 is held by a cylindrical holding member 55 so as to freely advance and retreat in the axial direction Da. The holding member 55 is supported by a supporting member 56 provided on the upstream side of the internal space 47F. The supporting member 56 is configured by a plurality of bar-like members that connects an outer surface of the holding member 55 to an inner surface of the internal space 47F.

The valve body 51 closes down an opening 57 of the air spraying hole 39F on an internal space 47F side by the valve shaft 50 moving to the downstream side. That is, the opening 57 of the air spraying hole 39F on the internal space 47F side functions as a valve seat corresponding to the valve body 51. The valve body 51 is movable to a first position of being in close contact with an air spraying hole 38F, which is illustrated in FIG. 10, and a second position of being separated away from the air spraying hole 38F, which is illustrated FIG. 11.

The first compression coil spring 53 is a biasing member that biases the valve body 51 in a direction of the first position. The first compression coil spring 53 is disposed between a surface 51a of the valve body 51, which faces the upstream side, and the supporting member 56. The valve shaft 50 is inserted on an inner circumferential side of the first compression coil spring 53 in the diameter direction. That is, the valve shaft 50 functions as a guide of the first compression coil spring 53.

One seat of the first compression coil spring 53 abuts a back surface of the valve body 51, and the other seat of the first compression coil spring 53 abuts the supporting member 56. Accordingly, elastic energy of the first compression coil spring 53 is exerted such that the valve body 51 is moved to the downstream side.

The second compression coil spring 54 is disposed between a surface 51b of the valve body 51, which faces the downstream side, and a surface 47b of the internal space 47F, which faces the upstream side. One seat of the second compression coil spring 54 abuts a fringe of the opening 57 of the air spraying hole 38F on the internal space 47F side, and the other seat of the second compression coil spring 54 abuts the surface 51b of the valve body 51, which faces the downstream side. Accordingly, elastic energy of the second compression coil spring 54 is exerted such that the valve body 51 is moved to the downstream side.

A shaft 58 that functions as a guide of the second compression coil spring 54 is provided on a tip of the valve body 51.

Spring constants of the first compression coil spring 53 and the second compression coil spring 54 are selected such that the valve body 51 closes the air spraying hole 38F in an atmosphere of a temperature (for example, 450° C.) of the compressed air A during normal operation of the gas turbine. In addition, by the pressure of the compressed air A being exerted on the surface 51a of the valve body 51, which faces the upstream side, the air spraying hole 38F is closed during normal operation of the gas turbine. That is, the compressed air A supplied to the internal space 47F via the purge air flow path 29 is not sprayed from the air spraying hole 38F during normal operation of the gas turbine.

The coefficient of thermal expansion of a metal forming the second compression coil spring 54 is higher than the coefficient of thermal expansion of a metal forming the first compression coil spring 53. That is, the second compression coil spring 54 expands more than the first compression coil spring 53 does in response to a temperature rise.

Specifically, the coefficients of thermal expansion of the first compression coil spring 53 and the second compression coil spring 54 are selected such that in a case where flame moves upstream due to a vortex core flashback and the temperatures of the atmosphere around the compression coil springs 53 and 54 have risen to 700° C., the second compression coil spring 54 thermally elongates more than the first compression coil spring 53 does and the valve body 51 separates away from the air spraying hole 39F. That is, the second compression coil spring 54 functions as the thermal elongation member that moves the valve body 51 to the second position by thermal elongation.

Figure 11:
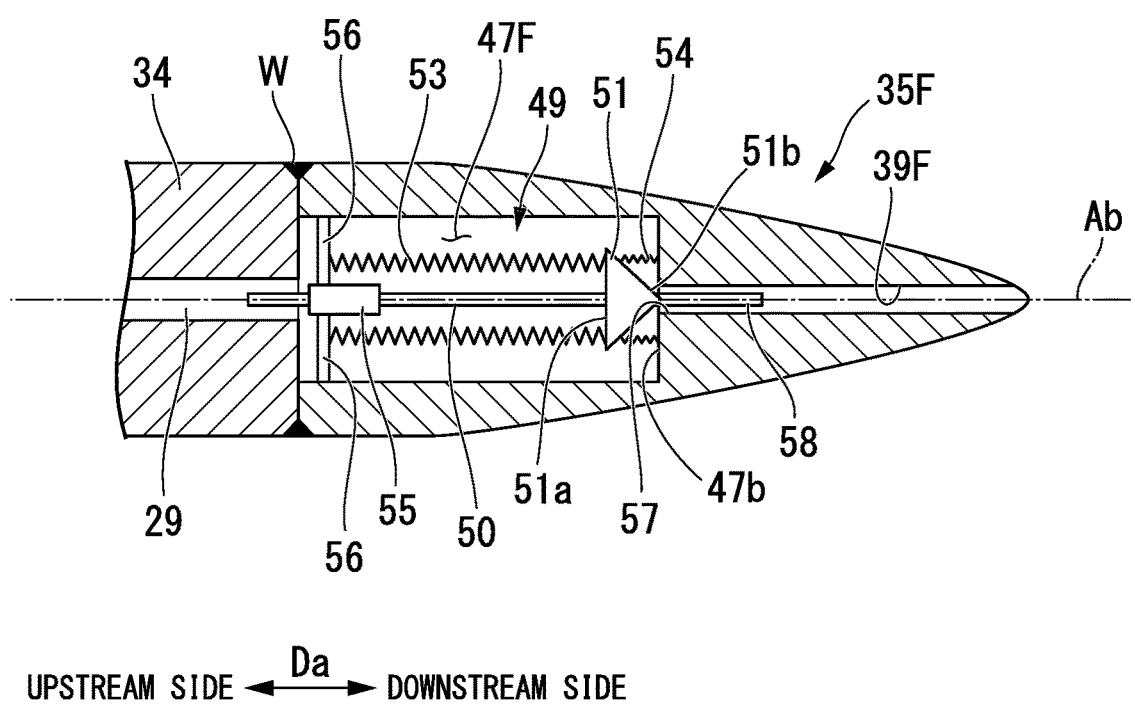
FIG. 11 is a sectional view of the main nozzle according to the fourth embodiment of the invention and is a view illustrating a valve device in an open state.

As illustrated in FIG. 11, for example, when flame moves upstream due to a vortex core flashback and reaches the main nozzle 24, the valve body 51 separates away from the opening 57 of the air spraying hole 39F on the internal space 47F side by thermal elongation of the second compression coil spring 54.

Accordingly, the compressed air A is sprayed via the air spraying holes 39F as purge air. By the compressed air A being sprayed, the vortex core flashback returns to the downstream side.

By the vortex core flashback returning to the downstream side, the temperatures of the atmosphere around the compression coil springs 53 and 54 decline. Accordingly, the second compression coil spring 54 contracts and the air spraying hole 39F is closed down by the valve body 51 of the valve device 49. Consequently, the jetting of the compressed air A stops.

According to the embodiment, even in a case where abnormal combustion such as a vortex core flashback has occurred, the compressed air A from the air spraying hole 39F is sprayed onto the downstream side of the main nozzle 24. For this reason, it is possible to avoid a vortex core flashback by lowering the distribution of fuel concentration of a vortex core. Accordingly, it is possible to prevent the combustors from being damaged by heat due to a vortex core flashback.

In addition, the valve device 49 can be repeatedly used even after the main nozzle 24 is exposed to a vortex core flashback.

Although a member thermally elongating by a vortex core flashback is set as a compression coil spring in the embodiment, the member is not limited thereto. A cylindrical member in which a plurality of ventilating holes are formed may be used instead of the compression coil spring.

In addition, although the air spraying hole 39F and the valve shaft 50 of the embodiment extend along the burner axis Ab, the invention is not limited thereto. A configuration where the air spraying hole 39F and the valve shaft 50 extend in one direction of tilting with respect to the burner axis Ab may be adopted.

Although the embodiments of the invention have been described hereinbefore, various modifications can be made without departing from the gist of the invention.

INDUSTRIAL APPLICABILITY

Even in a case where abnormal combustion such as a vortex core flashback has occurred, it is possible to avoid the vortex core flashback by compressed air being sprayed onto the downstream side of the nozzle main body in the combustor and the gas turbine.

REFERENCE SIGNS LIST

1: gas turbine
2: compressor
3: combustor
4: turbine
13: combustion cylinder
14: fuel jetter
15: pilot burner
16: main burner (nozzle main body)
24: main nozzle (shaft body)
26: swirling blade
29: purge air flow path
29a: air flow path main body
29b: diameter increasing portion
34: main nozzle main body
35: tip portion
38: fuel spraying hole
39: air spraying hole
40: sealing member
41: fuel flow path
43: spraying hole main body
44: plate accommodating portion (recessed portion)
47: internal space
48: thin portion
49: valve device
50: valve shaft
51: valve body
53: first compression coil spring
54: second compression coil spring (thermal elongation member)
56: supporting member
58: shaft
A: air
Ab: burner axis
Da: axial direction
F: fuel
PM: premixed gas

What is claimed is:
1. A combustor comprising:
a nozzle main body that includes:
a shaft body which extends along an axis and has, inside the shaft body, a purge air flow path, which extends along the axis to a tip portion of the shaft body and is configured to allow a compressed air flow, an air spraying hole formed in the tip portion of the shaft body, and a fuel flow path which is configured to allow a fuel flow, a swirling blade, which overhangs from an outer surface of the shaft body in a radial direction of the shaft body, wherein the radial direction is perpendicular to the axis, and which swirls a fluid flowing along the axis from an upstream end of the shaft body to a downstream end of the shaft body along an axial direction, and a fuel spraying hole which is formed in the swirling blade, the fuel spraying hole connected to the fuel flow path and configured to inject the fuel flow; and a sealing member that seals the air spraying hole, wherein the sealing member is formed of a metal having a melting point lower than a melting point of a metal forming the nozzle main body, wherein the tip portion of the shaft body is formed in a tapered shape tapering off toward the downstream end of the shaft body, wherein the air spraying hole is configured to connect the purge air flow path to the outer surface of the shaft body upon being opened by melting of the scaling member, and wherein the air spraying hole is angled with respect to the axis, and is configured to inject the compressed air flow toward the downstream end of the shaft body.

2. The combustor according to claim 1, wherein the sealing member has a plate shape, is formed around an opening of the air spraying hole on the outer surface of the shaft body, and is joined to a recessed portion into which the sealing member can be fitted.

3. A gas turbine comprising:

the combustor according to claim 1;

a compressor that compresses air and supplies the air to the combustor; and a turbine that is driven by a combustion gas formed by combustion of fuel in the combustor.

* * * * *